(12) United States Patent
Monkiewicz et al.

(10) Patent No.: US 9,159,102 B2
(45) Date of Patent: Oct. 13, 2015

(54) CLIENT DEPOSIT TRACKING

(71) Applicant: Bank of America Corporation, Charlotte, NC (US)

(72) Inventors: Shelaine M. Monkiewicz, Marietta, GA (US); Thomas A. Harp, Cincinnati, OH (US); James Pierce, Charlotte, NC (US); Lisa Gibson, Newnan, GA (US); Rebecca S. Morgan, Charlottesville, VA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/108,545

(22) Filed: Dec. 17, 2013

(65) Prior Publication Data

US 2015/0170266 A1    Jun. 18, 2015

(51) Int. Cl.
| | | |
|---|---|---|
| *G06Q 40/00* | (2012.01) | |
| *G06Q 30/00* | (2012.01) | |
| *G06Q 10/00* | (2012.01) | |
| *G06F 17/00* | (2006.01) | |
| *G06Q 40/02* | (2012.01) | |
| *G06Q 10/08* | (2012.01) | |

(52) U.S. Cl.
CPC ............ *G06Q 40/02* (2013.01); *G06Q 10/0832* (2013.01); *G06Q 10/0833* (2013.01)

(58) Field of Classification Search
CPC ....... G06Q 10/06; G06Q 40/00; G06Q 40/02; G06Q 10/087; G06Q 10/08; G07D 11/0066; G07D 11/009

USPC ........ 235/375, 379, 380, 385; 705/28, 35, 39, 705/43

See application file for complete search history.

(56) References Cited

U.S. PATENT DOCUMENTS

| | | | | |
|---|---|---|---|---|
| 5,921,180 | A | * | 7/1999 | Lee .............................. 101/288 |
| 2005/0108164 | A1 | * | 5/2005 | Salafia et al. ................... 705/42 |
| 2006/0224355 | A1 | * | 10/2006 | Morrison et al. ............. 702/173 |
| 2012/0278208 | A1 | * | 11/2012 | Walters ........................... 705/30 |

* cited by examiner

*Primary Examiner* — Laura Gudorf
(74) *Attorney, Agent, or Firm* — Weiss & Arons LLP; Michael A. Springs, Esq.

(57) ABSTRACT

Apparatus and methods for client deposit tracking are provided. The deposit may be tracked from a time the deposit is retrieved from a client location until a value of the deposit is credited to a client. A deposit may be tracked by affixing a bar-code to a cartridge storing containing the deposit. The bar-code may be printed on the cartridge. The bar-code may be electronically transmitted to the cartridge. The bar-code may include deposit information. The deposit information may include deposit weights. The bar-code may be captured an armored courier. Information captured from the bar-code may be transmitted to a financial institution. The financial institution may derive performance metrics based on the information captured from the bar-code. Deposit status determination may be provided based on the information capture from the bar-code. Deposits status information may be transmitted to a client of the financial institution.

8 Claims, 8 Drawing Sheets

| SCAN ID | TRANSMISSION RECEIVED BY FINANCIAL INSTITUTION | TRANSMISSION TO RETAIL LOCATION A | TRANSMISSION TO RETAIL LOCATION B |
|---|---|---|---|
| SCAN 1 | 10:30:00 DEPOSIT #1 AT RETAIL LOCATION A IS CASH ONLY, $10,000.00, PACKAGED AND READY FOR PICK-UP | ARMORED COURIER XYZ WILL ARRIVE AT RETAIL LOCATION A IN APPROXIMATELY 60 MIN. | ARMORED COURIER XYZ WILL ARRIVE AT RETAIL LOCATION B IN APPROXIMATELY 75 MIN. |
| SCAN 2 | 11:00:00 CASH REPLENISHMENT #2 IS ENROUTE TO RETAIL LOCATION B. (ETA 11:35:00) | | |
| SCAN 3 | 11:30:00 DEPOSIT #1 IN CUSTODY OF ARMORED COURIER XYZ | DEPOSIT #1 HAS BEEN PICKED UP BY ARMORED COURIER XYZ. FUNDS INCLUDED IN DEPOSIT #1 WILL BE AVAILABLE IN APPROXIMATELY 4 HOURS | ARMORED COURIER XYZ WILL ARRIVE AT RETAIL LOCATION B IN APPROXIMATELY 15 MIN. |
| SCAN 4 | 11:45:00 ARMORED COURIER XYZ DROP-OFF OF CASH REPLENISHMENT #2 AT RETAIL LOCATION B | | CASH REPLENISHMENT #2 HAS BEEN DROPPED OFF BY ARMORED COURIER XYZ AT 11:45 AM |
| SCAN 5 | 11:55:00 DEPOSIT #1 EN-ROUTE TO VAULT | | |
| SCAN 6 | 12:30:00 ARMORED COURIER XYZ ARRIVAL AT VAULT | DEPOSIT #1 WILL UNDERGO A RANDOM COUNTERFEIT TEST. | |
| SCAN 7 | 14:00:00 WEIGHING OF DEPOSIT #1 AT VAULT | | |
| SCAN 8 | 14:05:00 DESTRUCTION OF BAR-CODE AFFIXED TO DEPOSIT #1 | FUNDS INCLUDED IN DEPOSIT #1 ARE NOW AVAILABLE | |
| SCAN 9 | 15:00:00 DEPOSIT #2 IN CUSTODY OR ARMORED COURIER ABC | | DEPOSIT #2 HAS BEEN TRANSFERRED TO ARMORED COURIER ABC. FUNDS INCLUDED IN DEPOSIT #2 WILL BE AVAILABLE IN APPROXIMATELY 6 HRS. |

ARMORED COURIER PERFORMANCE SCORECARD

|  | ARMORED COURIER XYZ | ARMORED COURIER ABC |
|---|---|---|
| 701 — DAILY DISTANCE TRAVELED | 200 MILES | 230 MILES |
| 703 — AVERAGE PICK-UP TO DELIVERY TIME | 120 MINUTES | 150 MINUTES |
| 705 — NO. OF PICK-UPS | 5 | 7 |
| 707 — NO. OF DROP OFFS | 3 | 5 |
| 709 — TRAFFIC NORMALIZING FUNCTION | .1 | .2 |
| 711 — PERFORMANCE SCORE | 85% | 92% |

FIG. 7

CLIENT DEPOSIT TRACKING

FIELD OF TECHNOLOGY

Aspects of the invention relate to tracking a deposit from a client location until a value of the deposit is credited to the client.

BACKGROUND

A client of a financial institution may receive depositable items from customers. The client may be a provider of goods and/or services. The client may receive the depositable items in exchange for providing goods and/or services to customers. Exemplary depositable items may include cash, check and credit card payments. The client may package depositable items received from its customers. The packaged depositable items may be a deposit. The customer may wish to transfer a value of the depositable items to an account held at the financial institution. The client may wish to obtain a credit for a value of the depositable items as soon as possible.

To obtain the credit the client may transfer the deposit to a vault. The client may package the deposit and summon an armored courier service to transport the deposit. The client may utilize a plurality of different armored courier services to transport deposits. For example, the client may be a retail merchant that operated a plurality of stores in different geographic regions. Each geographic region may be serviced by a different armored courier service. Even within a single geographic region, the client may utilize a plurality of armored courier services.

An armored courier may transport a deposit from a client location to a vault. An armored courier may transport a cash replenishment supply from a vault location to a client location. An armored courier may transfer a plurality of deposits from a plurality of client locations. Each deposit may be transferred to a vault for processing. An armored courier may follow a pick-up schedule when retrieving deposits from a plurality of client locations.

A pick-up schedule may include inefficiencies. For example, a route selected by an armored courier may include numerous traffic signals or be susceptible to slow moving traffic. An inefficient pick-up schedule may delay a crediting of a value of a deposit to a client. It would be desirable in increase an efficiency of a deposit transfer between a client location and a vault.

A client may request a cash replenishment supply. For example, a client may require cash to provide "change" to customers. An armored courier may transfer a cash replenishment supply from a vault to a client location. An armored courier may transfer a plurality of cash replenishment supplies to a plurality of client locations. An armored courier may follow a drop-off schedule when delivering cash replenishment supplies to a plurality of client locations.

A drop-off schedule may include inefficiencies. For example, a route selected by an armored courier may include numerous traffic signals or be susceptible to slow moving traffic. An inefficient drop-off schedule may delay an arrival of cash to a client. It would be desirable in increase an efficiency of a cash transfer between a client location and a vault.

A vault may process depositable items on behalf of a client and/or financial institution. The vault may be operated by the financial institution or may be contracted by the financial institution to provide deposit processing services. For example, the vault may provide deposit processing services. Deposit processing services may include verifying contents of a deposit packaged by a client. To credit the client for a value of the payments, the financial institution may require the verification of the contents of a deposit.

When processing a deposit, a vault may count each depositable item packaged by a client. The vault may examine each depositable item packaged by a client. The vault may perform other suitable processing tasks. The client may package the deposit in a manner that slows the processing performed by the vault. For example, the client may package depositable items using rubber bands and/or paperclips. To process the deposit, the vault may need to remove the rubber bands and/or paperclips. Slowed processing of a deposit by the vault may delay a crediting of a value of the deposit to the client.

It would be desirable to reduce delays associated with vault processing of a deposit packaged by a client. It would be desirable reduce delays associated with crediting a value of a deposit to a client. It would be desirable to inform a client of an expected time when a deposit will be credited to the client. It would be desirable to inform a client of an expected time when a cash replenishment supply will arrive at a client location. It would be desirable therefore to provide apparatus and methods for client deposit tracking.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 6 shows illustrative information in accordance with principles of the invention; and FIG. 7 shows illustrative information in accordance with principles of the invention.

DETAILED DESCRIPTION OF THE INVENTION

Figure 1:
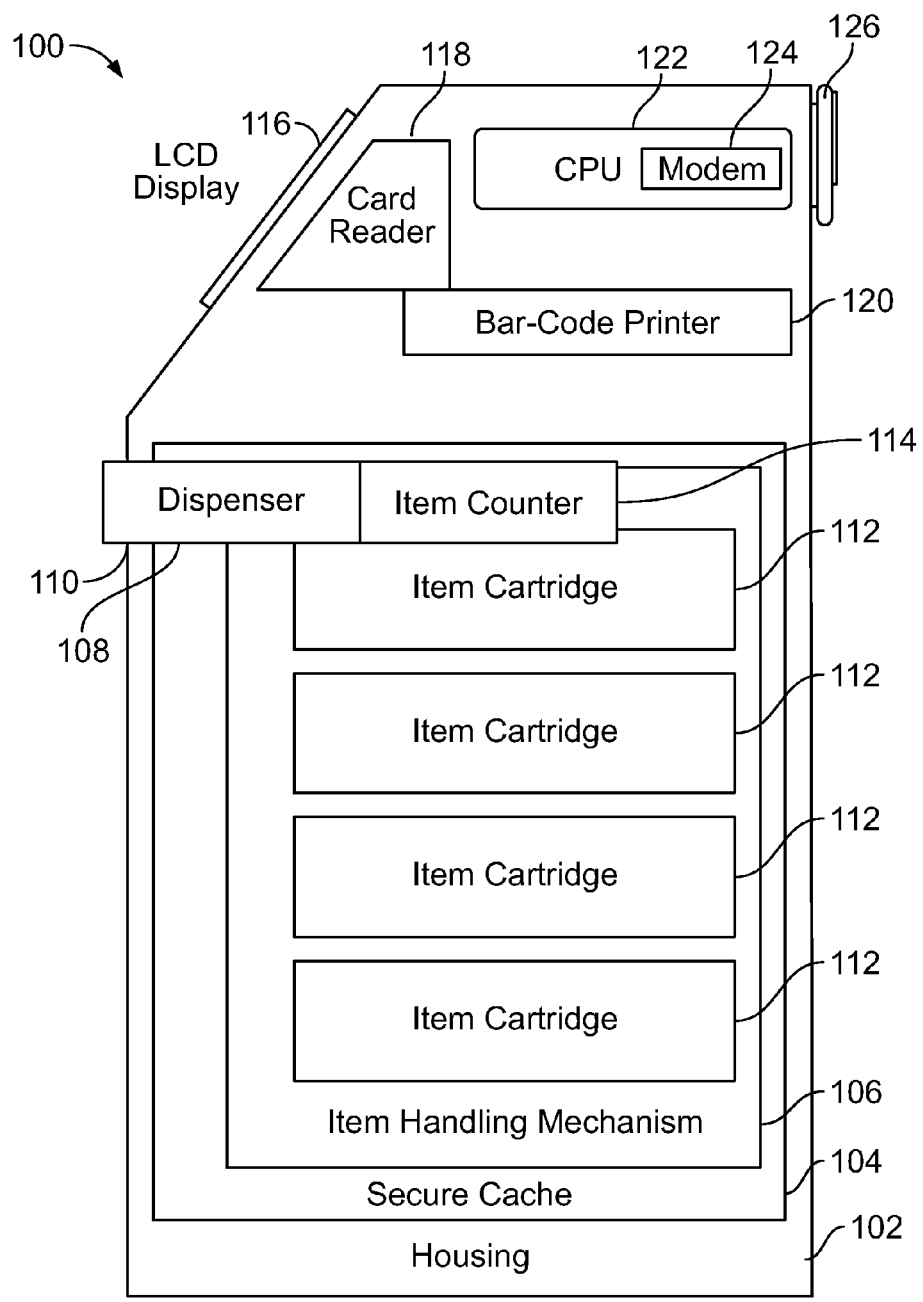
FIG. 1 shows an illustrative apparatus in accordance with principles of the invention.

Apparatus and methods for client deposit tracking are provided.

Methods may include preparing depositable items for transfer. The depositable items may be transferred from a client location. The depositable items may be transferred to a vault. The depositable items may include cash and/or checks. The cash may include coins or any suitable depositable item.

The preparing may include packaging the depositable items according to instructions provided by a bank. The preparing may be performed by a client of the bank. The instructions may describe how the depositable items should be packaged. For example, the instructions may direct the client to avoid packaging the depositable items using paperclips, rubber bands or staples. The instructions may limit an amount or number of coins that may be packaged together at one time.

The methods may include using a cash handling device to package the depositable items. The cash handling device may be a cash recycler, automated teller machine or any suitable device for sorting and counting depositable items.

The cash handling device may package the depositable items in a cartridge. The cartridge may include a "hard" receptacle such as a metal box. The cartridge may include a "soft" receptacle such as a bag or duffle. The cartridge may include any suitable receptacle for storing depositable items.

The methods may include determining an attribute associated with the depositable items packaged in the cartridge. For example, the attribute may include a denomination of bills stored in the cartridge. The attribute may include a weight of the depositable items and/or a weight of the cartridge. The weight may be determined before the cartridge is moved from a location. The weight may be determined after the cartridge arrives at a location. A difference in weight greater than a threshold weight may indicate that the cartridge had been opened or tampered with while being transferred from a first location to a second location. The first location may be associated with a client. The second location may be associated with a vault. The attribute may be any suitable attribute. Illustrative attributes are shown below in Table 1.

TABLE 1

Illustrative deposit attributes
Depositable Items Attributes

No Paper Clips
No Rubber Bands
No Staples
Excess Coins
No Non-Currency Items (i.e., Paper Dividers)
Single Denomination
Cash Only
Envelope Status
Counterfeit Status
Weight
Serial numbers of depositable items
Deposit value
Armored Courier ID
Vault ID The methods may include generating an electronic identifier corresponding to the attribute. In some embodiments, a programmable tag may be affixed to the cartridge. The methods may include transmitting the electronic identifier to the programmable tag. The programmable tag may include a display.

The display may present the electronic identifier. The electronic identifier may be presented as a bar-code. The electronic identifier may be presented as a quick-response ("QR") code. The electronic identifier may be presented by the programmable tag in any suitable format.

The methods may include capturing the electronic identifier. The electronic identifier may be captured from a display of the programmable tag. The electronic identifier may be transmitted by the programmable tag. The electronic identifier may be captured using a scanner including hardware. For example, the scanner may capture the electronic identifier by reading a bar-code displayed on the programmable tag.

The methods may include, using the scanner, capturing the electronic identifier from the programmable tag before the deposit and/or cartridge is moved from the client location. The scanner may be associated with the client location. The scanner may transmit the electronic identifier. The scanner may transmit the client location. The scanner may transmit information to a central computer system. The central computer system may be operated by a bank of the client.

In some embodiments, the programmable tag may include a global positioning system ("GPS") chip. GPS coordinates of the cartridge may be displayed on the programmable tag. The GPS coordinates may be incorporated into the bar-code or other format for displaying the electronic identifier.

The methods may include using the scanner, capturing the electronic identifier from the programmable tag after the deposit arrives at a vault. A scanner at the vault may be associated with the location of the vault and transmit the vault location along with the electronic identifier. The electronic identifier and/or vault location may be transmitted to a central computer system. The central computer system may be operated by a bank of the client.

The methods may include using the scanner, capturing the electronic identifier from the programmable tag after the deposit is moved from a client location and before the deposit arrives at a vault. The electronic identifier may be captured by the scanner while the deposit is in transit between the client location and the vault.

In some embodiments, the programmable tag may include a transmitter. For example, the programmable tag may include an embedded radio frequency identification ("RFID") tag. The RFID tag may be a passive RFID tag. The RFID tag may be an active RFID tag. A scanner may capture information from the RFID tag. The information may include one or more electronic identifiers.

The electronic identifier may correspond to a current location of the cartridge. The programmable tag may transmit the location of the cartridge according to a pre-determined schedule. The programmable tag may transmit the location of the cartridge in response to a signal received from a scanner.

The methods may include, in response to capturing the electronic identifier from the programmable tag, using an electronic transmitter including hardware, transmitting the electronic identifier to a computer system. The methods may include using the computer system determining a current location of the deposit. The computer system may be configured to transmit a current location of the deposit to the client. The client may specify a location to receive a current location of the deposit transmitted by the computer system.

The methods may include using a scale, weighing a cartridge after the depositable items have been packaged in the cartridge. The methods may include using an electronic transmitter including hardware, transmitting a weight of the cartridge to a computer system.

An attribute of the deposit transmitted to the programmable tag may include the weight of the cartridge after packaging the depositable items in the cartridge. The weight may be a first weight determined by a first scale. The first scale may be located at a location of the client. The first weight may be transmitted to a computer system. The first weight may be transmitted using a transmitter located at the client location. The first weight may be transmitted to the computer system using a transmitter of the programmable tag.

The methods may include using a second scale, determining a second weight of the cartridge. The second weight may be determined upon arrival of the cartridge at the vault. The second scale may be located at the vault. Using a second electronic transmitter including hardware, the methods may include transmitting the second weight to the computer system.

Using the computer system the first weight may be compared to the second weight. If a difference between the first weight and the second weight exceeds a threshold weight, a flag may be associated with the first weight and the second weight. The flag may indicate that the deposit is associated with a weight discrepancy. A bank may investigate why there is a discrepancy. The investigation may delay a crediting of a value of the deposit to the client. The client may be informed of the delay.

Methods may include using a plurality of scanners to capture an electronic identifier from the programmable tag at a plurality of times. Methods may include determining, using a computer system, a first time when the deposit was retrieved from the client location. Methods may include determining, using a computer system, a second time when the deposit arrived at the vault.

Apparatus may include a system for tracking depositable items packaged by a client. The depositable items packaged by the client may be transferred to an offsite vault. The system may include a deposit packager. The deposit packager may be a cash recycler, automated teller machine or any suitable device for sorting and counting depositable items.

The deposit packager may be configured to store the depositable items in a cartridge. The deposit packager may be configured to determine an attribute corresponding to the depositable items. Illustrative attributes are shown above in Table 1. The deposit packager may be configured to generate an electronic identifier corresponding to the attribute.

The system may include a programmable tag. The programmable tag may be affixed to the cartridge. The programmable tag may be configured to receive the electronic identifier determined by the deposit packager.

The system may include a scanner including hardware. The scanner may be configured to capture the electronic identifier from the programmable tag. The scanner may be an optical scanner. The scanner may be any suitable scanner.

The system may include a plurality of scanners. For example, a scanner may be associated with a location that is remote from the client and that is remote from the vault. The scanner may be configured to capture the electronic identifier and transmit to a computer system the location of the scanner and the electronic identifier associated with the programmable tag.

A scanner may be associated with an armored courier. For example, the scanner may be operated by armored courier personnel. The scanner may be associated with an electronic identifier corresponding to the armored courier. When the scanner captures information displayed on a programmable tag, the scanner may transmit the electronic identifier corresponding to the armored courier. The armored courier may be responsible for safeguarding the deposit at a time the scanner reads the programmable tag.

The armored courier may be absolved of responsibility for safeguarding the deposit at a time the scanner reads the programmable tag. For example, a first armored courier may transfer a deposit to a second armored courier. After a scan of an electronic identifier associated with the deposit by the second armored courier, the first armored courier may no longer be held responsible for safeguarding the deposit.

The system may include a scanner operated by a vault. The scanner operated by the vault may be associated with an electronic identifier corresponding to the vault. The scanner may capture information displayed by the programmable tag when the deposit arrives at vault or is in possession of the vault. At a time the scanner captures information on the deposit, the vault may be responsible for safeguarding the deposit. When the scanner at the vault captures information displayed or emitted by the programmable tag, the scanner may transmit the identification of the vault.

The computer system may include a processor. The computer system may include a non-transitory computer readable media storing computer executable instructions. The instructions when executed by the processor configure the computer system to perform one or more tasks. The one or more tasks may correspond to one or more steps in a method.

The instructions may configure the computer to receive information from the programmable tag. For example, the computer system may be configured to receive an electronic identifier corresponding to the attribute of the deposit. The electronic identifier may be received from a scanner that captured the identifier from a programmable tag. The instructions may configure the computer to receive information from one or more scanners.

The computer may be configured to calculate a projected time when at least a portion of a value of the depositable items will be credited to an account of the client held at a bank. The bank may operate and configure the computer system.

A client may transfer a plurality of deposits to vault. The plurality of deposits may be transferred to one or more vaults. For example, a client may operate a chain of stores that collects depositable items in exchange for goods or services provided to customers of the client. The computer executable instructions, when executed by the processor may configure the computer system to calculate a projected time for each deposit packaged by the client. The projected time may correspond to a time when the bank of the client estimates that at least a portion a deposit packaged by the client transferred to the vault will be credited to an account of the client.

Using a transmitter including hardware, the computer may transmit a difference between a projected time of a first deposit and a projected time of a second deposit. The first deposit may be transferred to/from a client by a first armored courier service. The first deposit may be transferred to/from a vault by a first armored courier service. The second deposit may be transferred to/from a client by a second armored courier service. The second deposit may be transferred to/from a vault by a second armored courier service.

A difference between a first projected time and a second projected time may be transmitted to the client. Based on the difference, the client may reschedule armored courier retrievals and/or drop-offs. The client may select an armored courier, bank and/or vault based on projected times associated with the armored courier service, bank and/or vault.

For example, a client may utilize a first armored courier service and a second armored courier service at a single client location. The client may receive projected times associated with the first armored courier service and the second armored courier service. The client may negotiate payment for armored courier services based on a difference between the projected times associated with the first armored courier and the projected times associated with the second armored courier. The difference may indicate that one of the armored couriers are servicing the client in a more efficient manner.

Methods may include normalizing projected times. Projected times may be normalized to account for differences in traffic patterns along a routes travelled by armored couriers. Projected times may be normalized to account for differences in distance travelled by armored couriers. Projected times may be normalized to account for differences in values of deposits, time of day or any suitable factor.

In some embodiments, a projected time may be transmitted to an armored courier service. In response to receiving the projected time the armored courier service may restructure routes, or otherwise improve efficiency of deposit transfers.

Methods of tracking a deposit packaged by a client are provided. The methods may include determining an attribute of the deposit packaged by the client. Illustrative attributes are shown above in Table 1. For example, the methods may include using a scale to determine a weight of the deposit packaged by the client. The deposit may be packaged by the client using a cash handling machine such as a cash recycler.

The methods may include using a computer system to generate a bar-code. The bar-code may correspond to one or more attributes of the deposit. For example, the bar code may correspond to a weight of the deposit. The weight may include a weight of depositable items and a cartridge holding the depositable items.

The methods may include, using a printer, printing the bar-code on a label. The printer may be a component of a cash handling machine that packaged the deposit. The methods may include using a stamper, affixing the label to the deposit. The label may be applied to a cartridge holding the deposit. The stamper may be component of a cash handling machine that packaged the deposit in the cartridge.

The label may seal the cartridge. For example, the stamper may affix a first end of the label to a cover of the cartridge. The stamper may affix a second end of the label to a body of the cartridge. The label may prevent an opening of the cover. Opening the cover may tear or otherwise damage the label. Using the label to seal a cartridge may provide safeguard against tampering with a cartridge holding depositable items.

The methods may include using a first scanner, scanning the bar-code at a first location. The first location may be determined based on an identifier associated with the scanner. For example, the scanner may be associated with a device identifiers such as a MAC address. A database may link the MAC address to a location. In some embodiments, the scanner may be associated with a receiver of GPS signals. For example, a receiver of GPS signals may be mounted on an armored courier vehicle used to transport a deposit. Based on received GPS signals, the scanner may determine a current location of the deposit. In some embodiments, GPS signals may be transmitted to a remote computer system. The remote computer system may determine a geographic location based on the received GPS signals.

The methods may include, using a second scanner, scanning the bar-code at a second location. The second location may be determined using one or more of the techniques used to determine the first location. The methods may include using a third scanner, scanning the bar-code at a third location. The third location may be determined using one or more of the techniques used to determine the first location.

The methods may include, using an electronic receiver including hardware, receiving information. The electronic receiver may be a component of a computer system. The information received by the receiver may include information transmitted by a scanner. The information may include attributes of a deposit encoded in a bar-code. The information may include a location of a scanner. The information may include a location of a cartridge.

The computer system may be configured to associate a time-stamp with a location. The methods may include receiving a plurality of locations. The methods may include associating each of the plurality of locations with a time-stamp. The methods may include identifying a projected time when at least a portion of a value of a deposit may be credited to an account of the client. The account may be held at a bank.

A projected time may be determined based time-stamps received from one or more scanners. A projected time may be determined based on an identity of an armored courtier transporting the deposit. A projected time may be determined based on a time difference between a first scan of the bar-code and a second scan of the bar-code. The projected time may be determined based on the time of day corresponding to a time-stamp.

For example, an armored courier may be assigned to retrieve deposits from two clients that are located 100 miles from each other. When the armored courier retrieves a deposit from the first client, the first client may be informed that a value of the deposit may be credited to an account of the first client within three hours. The three-hour time window may include time needed for the armored courier to drive to the second client, retrieve a deposit from the second client and transport both deposits to a vault.

If the armored courier retrieves a deposit from the first client after 5 PM, the first client may be informed that the value of the deposit may be credited to the account on the next business day. Based on information informing a client when a value of a deposit is expected to be credited, the client may more efficiently manage expenditures.

In some embodiments, if a bank transmits a projected time to a client, the bank may associate a guarantee with the projected time. For example, a bank may transmit a projected time informing a client that after three hours from a time a deposit was retrieved from a location of the client, a value of the deposit is expected to be credited to an account of the client. The client may enter into transactions relying on the projected time. If the value is not credited to the client's account within three hours, the bank may supply a temporary credit to the client's account, or otherwise protect the client's financial position, until the value of the deposit is credited to the client's account.

The methods may include, using an electronic transmitter including hardware, transmitting a time-stamp to a client. When a plurality of time-stamps is determined for a plurality of locations, the methods may include transmitting each of the time-stamps to the client. The methods may include, using an electronic transmitter including hardware, transmitting one or more time-stamps to a bank of the client.

Based on the time-stamps, a client or bank may identify an entity responsible for the deposit. For example, the bank may receive an attribute of a deposit scanned by a first armored courier service employee at a first time. The bank may hold the armored courier responsible for the deposit until the bank receives an attribute of the deposit scanned by a second entity at a second time. The second entity may be a second armored courier or a vault.

Based on a historical record of received time-stamps. Methods may include using a computer system including hardware to identify a first entity that accepted responsible for the deposit at a first location. Methods may include identifying a second entity that accepted responsibility for the deposit at a second location. Methods may include identifying a third entity that accepted responsibility for the deposit at a third location. Based on an identification of an entity responsible for the deposit, the entity may be held accountable for any mishaps or damage to the deposit while the deposit is in possession or custody of the entity.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative self-service device 100. Self-service device 100 may include housing 102. Self-service device 100 may include safe cache 104. Safe cache 104 may hold depositable items (not shown). Item handling mechanism 106 may be present in safe cache 104. Item handling mechanism 106 may package, arrange, dispense and/or otherwise handle depositable items. For example, item handling mechanism 106 may include conveyors, rollers, belts, tracks, pickers or any suitable components for positioning and packaging depositable items. Depositable items (not shown) in item handling mechanism 106 may be packaged in cartridges 112. For example, when the depositable items are bills, cartridges 112 may be cash cartridges.

Depositable item handling mechanism 106 may include counter 114. Counter 114 may count depositable items prior to or packaging depositable items in cartridges 112.

Self-service device 100 may include LCD display 116 and a keypad (not shown) for customer interaction. Card reader 118 may be present for receiving transaction information from the customer via a suitable transaction instrument. Self-service device 100 may include bar-code printer and dispenser module 120. Bar-code printer and dispenser module 120 may provide a label that displays one or more attributes of depositable items stored in safe cache 104. CPU 120 may control client I/O, dispensing processes, which may include initialization, actuation, dispensing, packaging and any other suitable processes, bar-code printing, label dispensing, transaction channel communications and any other suitable processes. The transaction channel communications may be performed using modem 124, which may be any suitable communication device. Modem 124 may communicate with a local or regional network router (not shown). For example, modem 124 may utilize antenna 126 may to transmit information such as attributes of depositable items to a remote computer system.

Figure 2A:
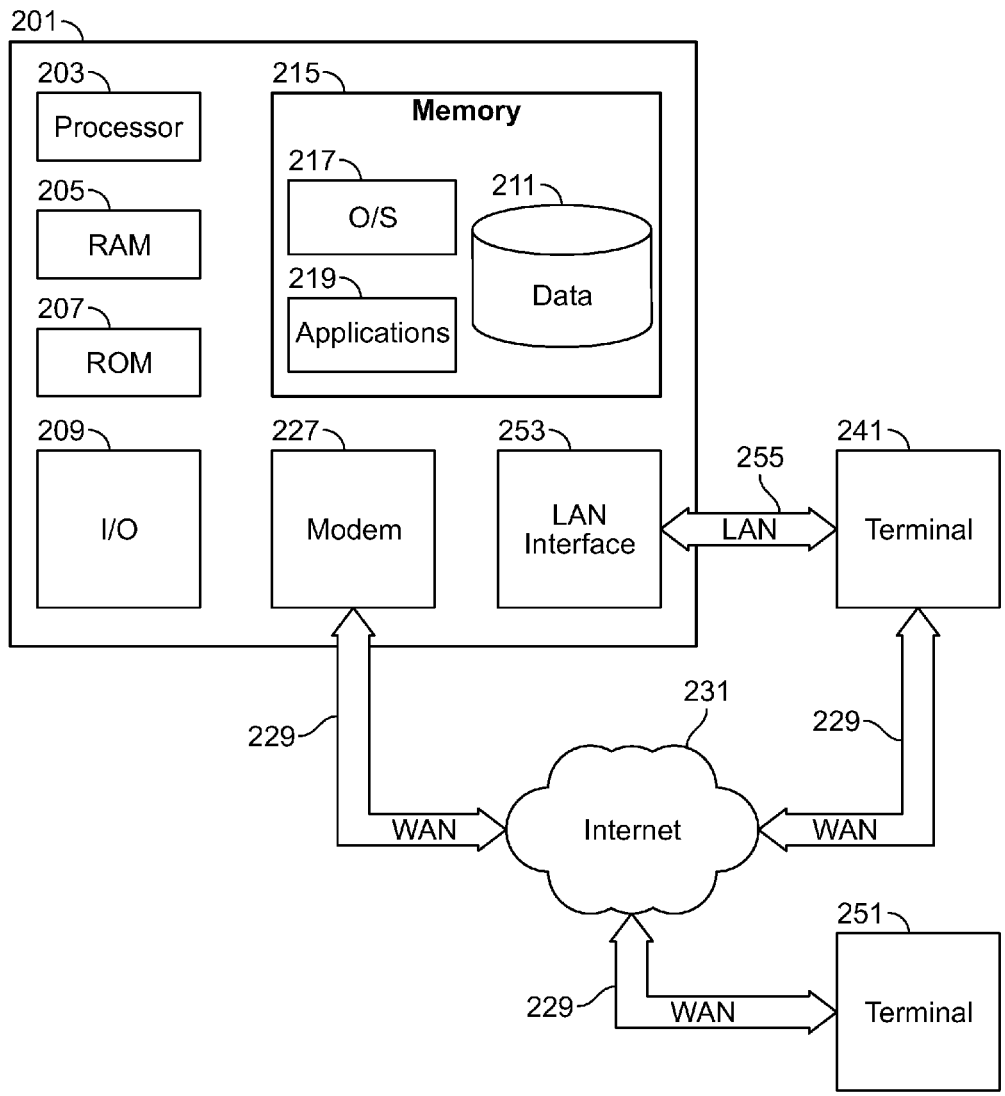
FIG. 2A shows an illustrative apparatus in accordance with principles of the invention.

FIG. 2A is a block diagram that illustrates a computing device 201 (alternatively referred to herein as a "server or computer") that may be used according to an illustrative embodiment of the invention. The computer server 201 may have a processor 203 for controlling overall operation of the server and its associated components, including RAM 205, ROM 207, input/output ("I/O") module 209, and memory 215.

I/O module 209 may include a microphone, keypad, touch screen and/or stylus through which a user of device 201 may provide input, and may also include one or more of a speaker for providing audio output and a video display device for providing textual, audiovisual and/or graphical output. I/O module 209 may include any suitable transmitter including hardware and/or any suitable receiver including hardware.

Software may be stored within memory 215 and/or other storage (not shown) to provide instructions to processor 203 for enabling server 201 to perform various functions. For example, memory 215 may store software used by server 201, such as an operating system 217, application programs 219, and an associated database 211. Alternatively, some or all of computer executable instructions of server 201 may be embodied in hardware or firmware (not shown).

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2A include a local area network (LAN) 255 and a wide area network (WAN) 229, but may also include other networks. When used in a LAN networking environment, computer 201 is connected to LAN 255 through a network interface or adapter 253. When used in a WAN networking environment, server 201 may include a modem 227 or other means for establishing communications over WAN 229, such as Internet 231.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown). Terminal 251 and/or terminal 241 may be portable devices such as a laptop, tablet, smartphone or any other suitable device for receiving, storing, transmitting and/or displaying relevant information.

Any information described above in connection with database 211, and any other suitable information, may be stored in memory 215. One or more of applications 219 may include one or more algorithms that may be used to receive transmissions from a scanner, calculate performance scores, determine a location, determine a projected time, identify difference in datasets and/or any other suitable tasks.

Apparatus shown in FIG. 1 may include one or more features of server 201.

Figure 2B:
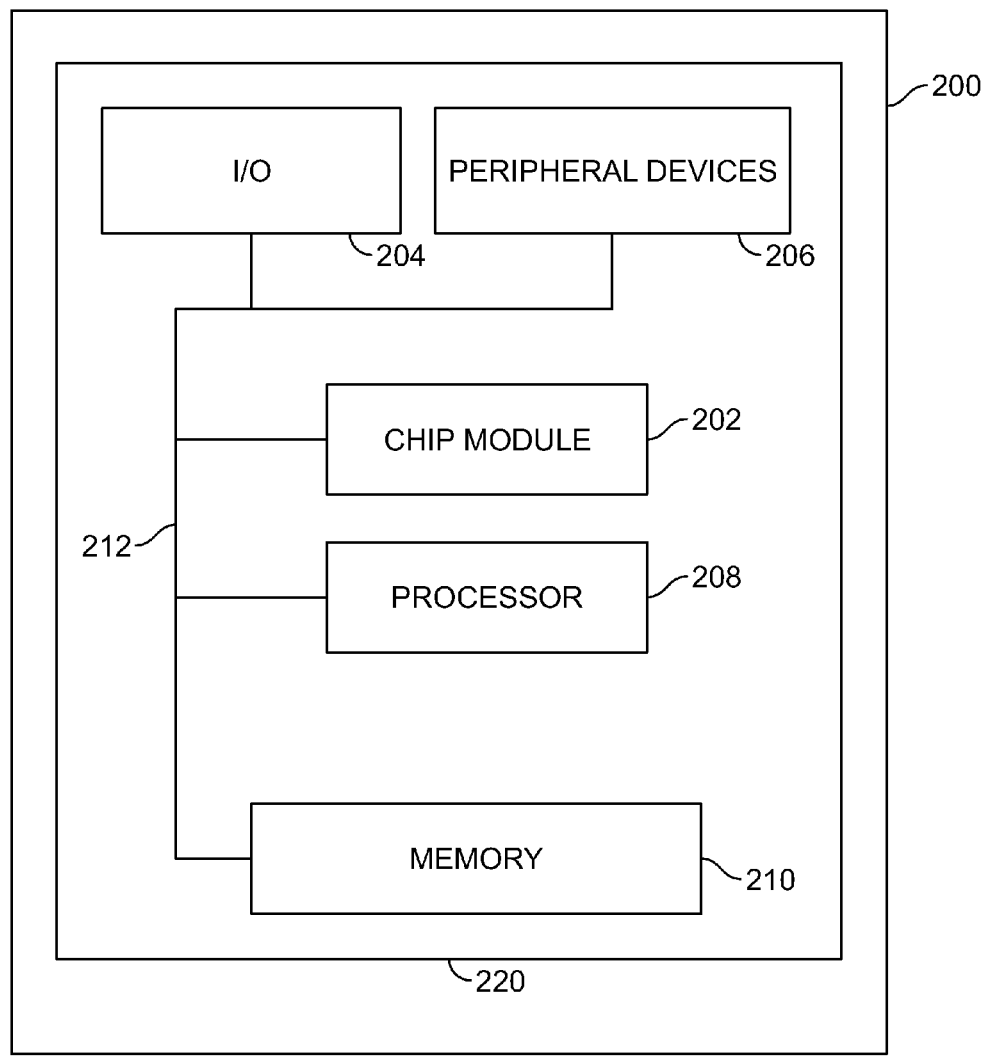
FIG. 2B shows an illustrative apparatus in accordance with principles of the invention.

FIG. 2B shows illustrative apparatus 200. Apparatus 200 may be a computing machine. Apparatus 200 may be included in apparatus shown in FIG. 2A. Apparatus 200 may include chip module 202, which may include one or more integrated circuits, and which may include logic configured to perform any suitable logical operations.

Apparatus 200 may include one or more of the following components: I/O circuitry 204, which may include the transmitter device and the receiver device and may interface with fiber optic cable, coaxial cable, telephone lines, wireless devices, PHY layer hardware, a keypad/display control device or any other suitable encoded media or devices. Peripheral devices 206, may include counter timers, real-time timers, power-on reset generators or any other suitable peripheral devices. Logical processing device 208 may compute data structural information, structural parameters of the data, quantify indices and machine-readable memory 210.

Machine-readable memory 210 may be configured to store in machine-readable data structures: scanned information associated with a deposit, scanned information associated with an armored courier, information associated with a client, electronic identifiers, associations, relationships and any other suitable information or data structures.

Components 202, 204, 206, 208 and 210 may be coupled together by a system bus or other interconnections 212 and may be present on one or more circuit boards such as 220. In some embodiments, the components may be integrated into a single silicon-based chip.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
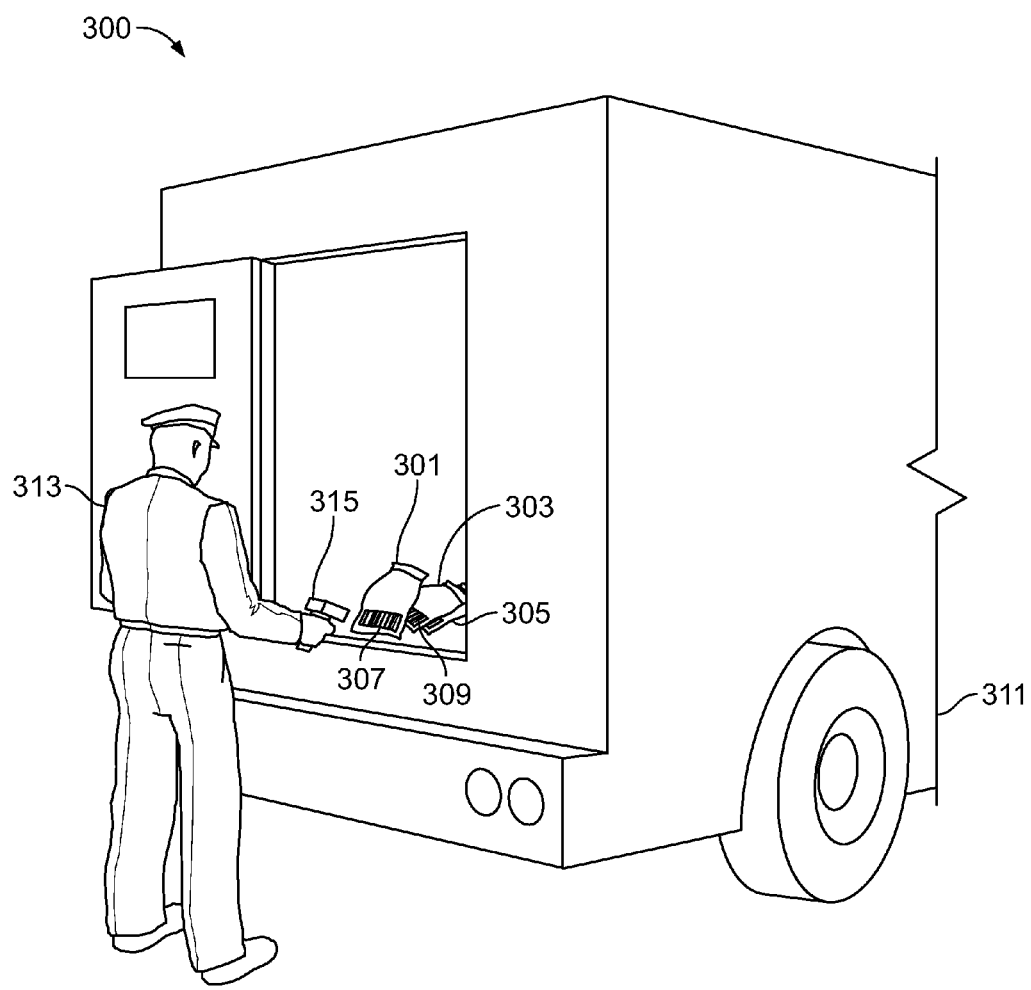
FIG. 3 shows an illustrative scenario in accordance with principles of the invention.

FIG. 3 shows illustrative scenario 300. Scenario 300 shows armored courier employee 313 scanning cartridges 301, 303 and 305 using scanner 315. Scanning a cartridge may include capturing a bar-code affixed to the cartridge. For example, in scenario 300, using scanner 315 armored courier employee 313 may capture information encoded within bar-code 307 and/or bar-code 309.

The information encoded within a bar-code may include an attribute of the deposit packaged in the cartridge. In some embodiments, the attribute may indicate to armored courier employee 313 that the deposit is associated with a priority. For example, a bar-code may indicate that a cartridge should be transferred to a vault within a time frame specified by the bar-code.

Scanner 315 may record a date and time when capturing information from bar-code 307 and/or bar-code 309. The information encoded within a bar-code, and date/time associated with each scanned bar-code, may be transmitted to a computer system such as server 201 (shown in FIG. 2A). The computer may store the received information in a database such as database 211 (shown in FIG. 2A). The computer system may identify patterns or inefficiencies relating to a transfer of a cartridge from a client location to a bank and/or vault. The patterns or inefficiencies may be identified based on analysis of information stored within the database. Responsibility for a deposit may be determined based on information stored within the database.

Figure 4:
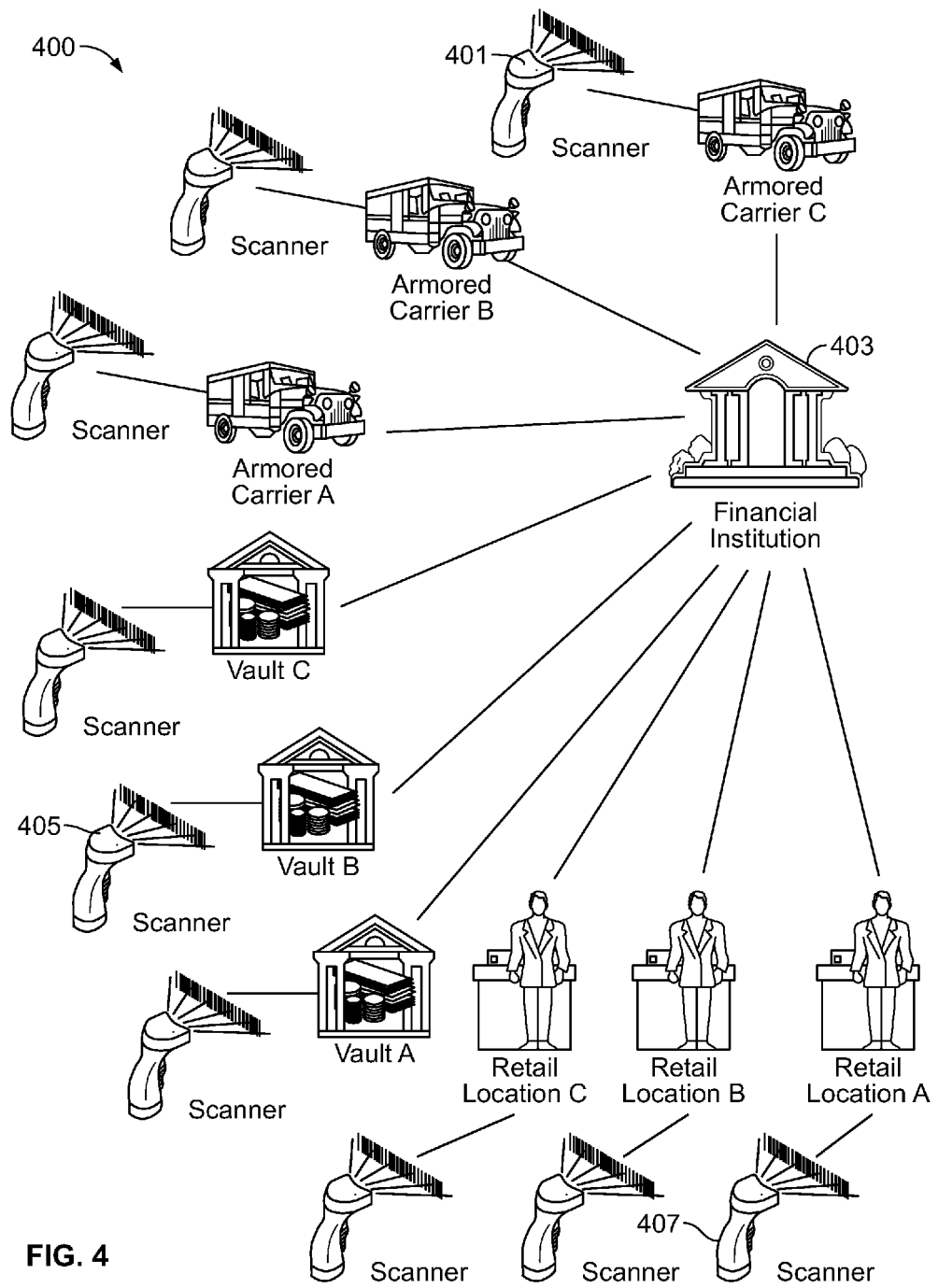
FIG. 4 shows an illustrative arrangement in accordance with principles of the invention.

FIG. 4 shows illustrative arrangement 400. Arrangement 400 shows various locations that may be associated with a scanning device. For example, Armored Courier C may be associated with scanner 401. Armored Courier C may operate scanner 401. When Armored Courier C takes possession of a deposit, a bar-code or other electronic identifier displayed on the deposit may be scanned using scanner 401. When Armored Courier C transfers possession of the deposit to another entity, the deposit may be scanned using scanner 401. Data captured by scanner 401 may be transferred to Financial Institution 403. Financial Institution 403 may monitor a location and transfer of the deposit in possession of Armored Courier C.

Arrangement 400 shows that a vault may be associated with a scanner. For example, Vault B is associated with scanner 405. Vault B may scan deposits when they arrive at Vault B using scanner 405. When Vault B takes possession of a deposit from an armored courier, a bar-code or other electronic identifier displayed on the deposit may be scanned using scanner 405. The electronic identifier or other information captured by scanner 405 may be transmitted to Financial Institution 403. Based on the information captured by scanner 405, Financial Institution 403 may determine a projected time when a value of the deposit will be available to a client of Financial Institution 403.

Arrangement 400 shows that a client location may be associated with a scanner. For example, arrangement 400 shows that Retail Location A is associated with scanner 407. Scanner 407 may be used to scan a bar-code or other electronic identifier displayed on the deposit and/or cartridge. Information captured by scanner 407 may be transmitted to Financial Institution 403. The scan may confirm one or more attributes of the deposit before the deposit is moved from Retail Location A. The information captured by scanner 407 may allow Financial Institution 403 to determine a time when a value of the deposit will be available to Retail Location A.

Based on information captured by a scanner at a Retail Location or Armored Courier, Financial Institution 403 may direct a Vault to perform addition processing tasks. For example, based on a sequence of scans received by Financial Institution 403, Vault B may be instructed to inspect integrity of deposit packaging, such as a cartridge. The inspection of the packaging may determine if one or more depositable items have been extracted from the deposit while being transported to Vault B.

As a further example, a sequence of scans may suggest that the deposit has taken an unusually long time to progress from a Retail Location to a Vault. The vault may be instruct to weigh the deposit upon arrival at the Vault. The weight of the deposit determined by the Vault may be compared to a weight encoded in the bar-code and determined at a time the deposit was retrieved from the Retail Location. A difference between the weights may indicate that the deposit has been tampered with prior to arrival at the Vault. An entity responsible for transporting the deposit from the Retail Location to the Vault may be charged for any loss arising from the tampering.

Figure 5:
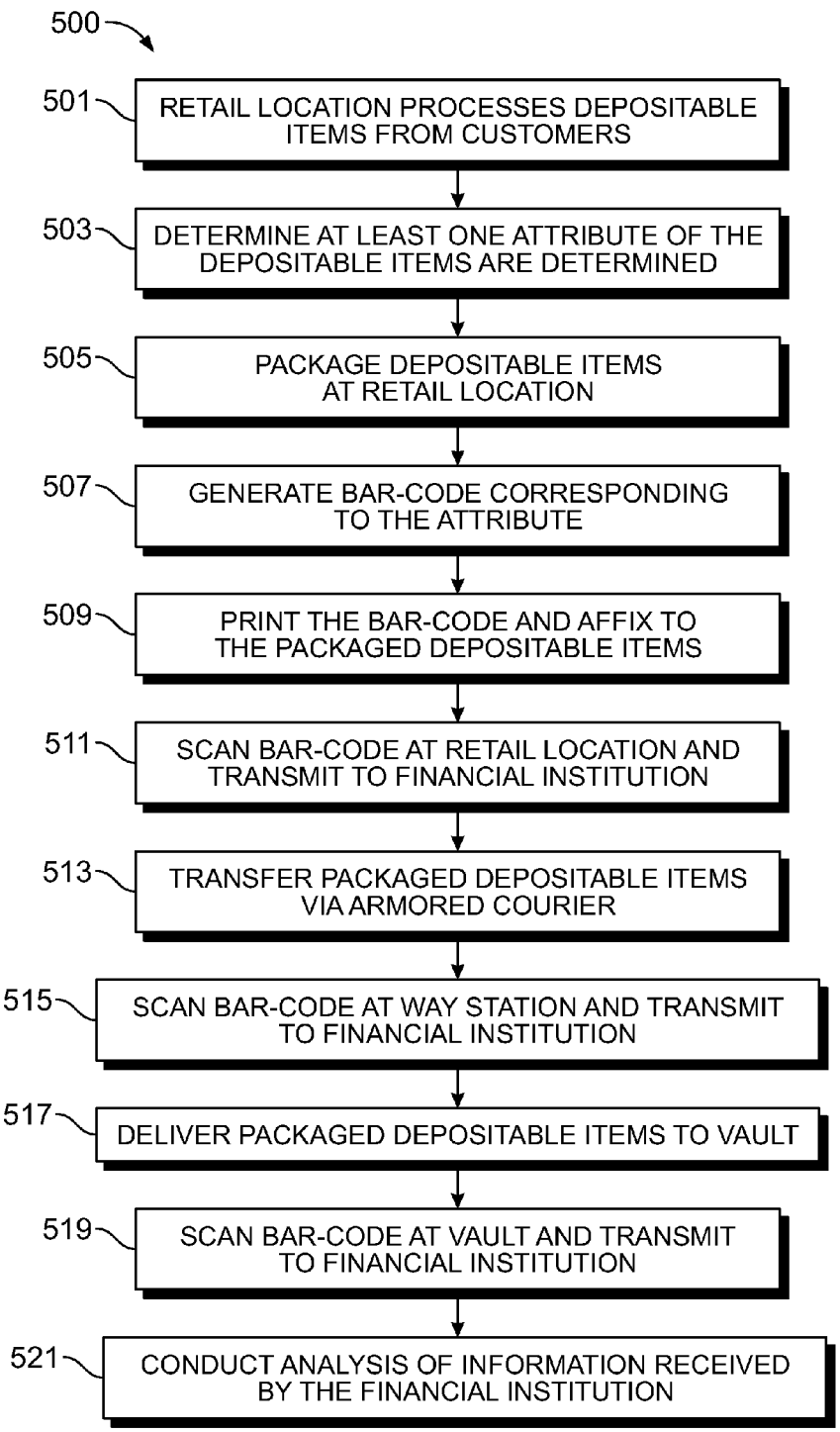
FIG. 5 shows an illustrative process in accordance with principles of the invention.

FIG. 5 shows illustrative process 500. For the sake of illustration, one or more of the steps of the process illustrated in FIG. 5 will be described as being performed by a "system." The "system" may include one or more of the features of the apparatus, arrangements or processes shown in FIGS. 1-4 and/or any other suitable device or approach. The "system" may be provided by an entity. The entity may be an individual, an organization or any other suitable entity.

At step 501, the system may receive depositable items from customers of a retail location. The system may process the depositable items using a cash handling machine (shown above in FIG. 1). At step 503, the system may determine at least one attribute of the depositable items. Illustrative attributes are shown above in Table 1. At step 505, the system may package the depositable items. The depositable items may be packaged in a cartridge. The depositable items may be packaged at the retail location.

At step 507, the system generates a bar-code corresponding to the attribute. The system may generate any suitable identifier. For example, the system may generate an electronic identifier corresponding to the attribute. At step 509, the system prints the bar-code and affixes the bar-code to the packaged depositable items. The electronic identifier may be included in the bar-code. The bar-code may be printed on a label. The label may include an adhesive on one side of the label. The label may be affixed to the packaged deposit by a cash handling device (shown above in FIG. 1).

In some embodiments an electronic identifier may be transmitted to a programmable tag affixed to a cartridge. The programmable tag may include a screen for displaying the electronic identifier.

At step 511, the system captures information included in the bar-code. The information may be captured by scanning the bar-code. The scanning may occur at the retail location. The scanning may occur at any suitable location. At step 511, the system transmits the captured bar-code to a financial institution. At step 513, the system transfers the packaged depositable items via armored courier. The armored courier may transport the packaged depositable items from the retail location to a vault. At step 515, the system may scan the bar-code at a way station. The way station may be a vault, another retail location or any suitable location. At step 515, the scan of the bar-code captured at the way station is transmitted to the financial institution.

At step 517, the system delivers the packaged depositable items to a vault. At step 519, the system scans a bar-code affixed to the deposit at the vault. Information captured by the scan of the bar-code is transmitted to the financial institution. At step 521, the system conducts an analysis of information received by the financial institution. The analysis may include determining a projected time for crediting the client for future transfers of depositable items.

FIG. 6 shows illustrative information 600. Information 600 shows transmissions 601. Transmissions 601 are received by a financial institution in response to scan ID's 607. For example, information transmitted in response to Scan #1 includes a time-stamp, 10:30:00. The time-stamp may correspond to a time Scan #1 occurred. In some embodiments, the time-stamp may correspond to a time when information captured by Scan #1 is received at a financial institution. Information captured by Scan #1 may indicate to the financial institution that Deposit #1 has been packaged at Retail Location A.

Scan #1 may capture an attribute of the deposit packaged by Retail Location A. For example, Scan #1 may capture information indicating that Deposit #1 includes $1,000.00 and is cash only (i.e., no checks).

Information 600 shows transmissions 603. Transmissions 603 are transmitted to Retail Location A. Retail Location A may be a client of the financial institution. In response to information captured by Scan #1, Retail Location A is informed that Armored Courier XYZ will arrive at Retail Location A in approximately 60 minutes to retrieve Deposit #1. Retail Location A may arrange for an employee to be available at the time Armored Courier XYZ is expected to arrive and retrieve Deposit #1. Information included in transmission 603 may help Retail Location A avoid missing an opportunity to transfer a deposit to a vault.

Information 600 shows transmissions 605. Transmissions 605 are transmitted to Retail Location B. Retail Location B may be a client of the financial institution. In response to Scan #1, Retail Location B is informed that Armored Courier XYZ will arrive at Retail Location B in approximately 75 minutes.

Information 600 shows that in response to Scan #2, a financial institution is informed that a cash replenishment is en route to Retail Location B. Scan #2 may correspond to a retrieval of cash from a vault or client of the financial institution.

Information 600 shows that in response to Scan #3, the financial institution is notified that Deposit #1 (retrieved from Retail Location #1) is in possession of Armored Courier XYZ. Scan #3 may be performed using a scanner operated by an employee of Armored Courier XYZ. In response to Scan #3, Retail Location A may receive confirmation that Armored Courier XYZ has taken responsibility for Deposit #1. In response to Scan #3, Retail Location A may be informed of a projected time when a value of Deposit #1 may be credited or otherwise available to Retail Location A. In response to Scan #3, Retail Location B receives an update of when Armored Courier XYZ is expected to arrive at Retail Location B.

Information 600 shows that in response to Scan #4, the financial institution is informed that Armored Courier XYZ has transferred a replenishment amount to Retail Location B. In response to Scan #4, Retail Location B receives confirmation that the replenishment amount has been received from Armored Courier XYZ.

Information 600 shows that in response to Scan #5, the financial institution receives an updated status on movement of Deposit #1. Scan #6 may correspond to a transmission of information by a programmable tag affixed to a packaged deposit. The programmable tag may be configured to transmit a signal at fixed or random intervals. Scan #6 may correspond to information captured at a way-station while en route to a destination of Deposit #1.

Information 600 shows that in response to Scan #6, the financial institution is informed that Armored Courier XYZ and Deposit #1 have arrived at a vault. In response to Scan #6, Retail Location A is informed that Deposit #1 will undergo counterfeit testing. Counterfeit testing of depositable items included in Deposit #1 may delay a crediting of a value of the deposit to Retail Location A.

Information 600 shows that in response to Scan #7, the financial institution is informed that Deposit #1 has been weighed at the vault. The weighing may be part of a counterfeit testing procedure. The weight of Deposit #1 may be compared to a weight of Deposit #1 determined before Deposit #1 was moved from Retail Location A.

Information 600 shows that in response to Scan #8, the financial institution is informed that a bar-code associated with Deposit #1 has been destroyed. A bar-code may be destroyed by disposing a label affixed to the deposit. A bar-code or other electronic identifier may be destroyed by clearing a section of memory in a programmable tag. The destruction of the bar-code may indicate that the depositable items included in Deposit #1 have been verified and counted by the vault.

The depositable items included in Deposit #1 may be reintroduced into currency circulation. The depositable items included in Deposit #1 may be transferred to another financial institution for further processing. For example, if the depositable item is cash, the vault may repackage the cash to fulfill a replenishment request of a client. If the depositable item is a check, the check may be transmitted a financial institution of a drawer of the check for further processing.

Information 600 shows that in response to Scan #9, the financial institution is informed that Deposit #2 is in possession of Armored Courier ABC. Scan #9 may correspond to a pick-up of Deposit #2 from Retail Location B. In response to Scan #9, Retail Location B is informed that a value of depositable items included in Deposit #2 will be available to Retail Location B in approximately 6 hours.

FIG. 7 shows illustrative armored courier performance scorecard 700. Information 700 shows a comparison of a performance of Armored Courier XYZ and Armored Courier ABC. Row 701 shows a comparison of average distance travelled by each Armored Courier. The average distance travelled may be determined by constructing a map of scan locations. A distance between each of the scan locations may be summed to determine a total distance travelled. A total distance travelled may be computed hourly, daily, monthly, yearly or over any suitable interval of time. The daily distance may be averaged for a week or month.

Row 703 shows a comparison of an average time interval between pick-up of a deposit and delivery of the deposit to a vault. The interval may include a plurality of intervening stops of each armored courier at various locations. The pick-up time may be determined by scan of the deposit at a client location or way-station. The delivery time may be determined by a scan of the deposit upon arrival at a vault.

Row 705 shows a comparison of a total number of deposit pick-ups performed. Each deposit pick-up may be registered in a database in response to a scan of the deposit. The total number of pick-ups may show which armored courier is performing a greater number of pick-ups. The total number may be determined for a given time interval. The time interval may be any suitable interval such as 2 hours, one day, a year or five years. Row 707 shows a comparison of a total number of deposit drop-offs performed by each armored courier. The total number of drop-offs may be determined over a given time interval. The time interval may be any suitable time interval.

Row 709 shows exemplary results of applying a traffic normalizing function to performance data associated with armored courier XYZ and armored courier ABC. The traffic normalizing function may take account of different traffic patterns in routes travelled by each armored courier. A difference in traffic patterns may impact pick-up to delivery time 703.

Row 711 shows a performance score for each armored courier. The performance score may be determined based on a level of compliance with terms in a service level agreement ("SLA") between a financial institution and an armored courier service. The performance score may allow the financial institution to assess an armored courier's compliance with terms in the SLA.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, apparatus and methods for client deposit tracking have been provided. Persons skilled in the art will appreciate that the present invention can be practiced by other than the described embodiments, which are presented for purposes of illustration rather than of limitation. The present invention is limited only by the claims that follow.

What is claimed is:

1. A system for tracking depositable items packaged by a client and transferred to an offsite vault, the system comprising:
   a deposit packager configured to:
      store the depositable items in a cartridge;
      determine an attribute corresponding to the depositable items; and
      generate a first electronic identifier corresponding to the attribute;
   a programmable tag affixed to the cartridge and configured to receive the first electronic identifier; and
   a first scanner including hardware, configured to capture the first electronic identifier from the programmable tag;
   a second scanner configured to:
      capture the first electronic identifier from the programmable tag; and
      transmit to a computer system:
         the first electronic identifier; and
         a second electronic identifier corresponding to an armored courier; and
   a third scanner configured to:
      capture the first electronic identifier from the programmable tag; and
      transmit to the computer system:
         the first electronic identifier; and
         a third electronic identifier corresponding to the vault; and
   wherein, the computer system comprises a processor and a non-transitory computer readable media storing computer executable instructions, that when executed by the processor configure the computer system to:
      receive the first electronic identifier, the second electronic identifier and the third electronic identifier; and
      calculate a projected time when at least a portion of a value of the depositable items will be credited to an account of the client held at a bank.

2. The system of claim 1 wherein the second scanner is associated with a location that is remote from the client and that is remote from the vault; and
   the second scanner is configured to transmit the location to the computer system.

3. The system of claim 1, wherein the depositable items correspond to a first deposit of the client, the computer executable instructions, when executed by the processor further configure the computer system to:
   calculate a second projected time when at least a portion a second deposit of the client transferred to the vault will be credited to the account; and
   transmit, to the client, a difference between the first projected time and the second projected time.

4. The system of claim 3 wherein:
   the first deposit is transferred by a first armored courier service; and
   the second deposit is transferred by a second armored courier service.

5. A method of tracking a deposit packaged by a client, the method comprising:
   using a scale, determining a weight of the deposit;
   using a computer system, generating a bar-code encoding the weight;
   using a printer, printing the bar-code on a label;
   using a stamper, affixing the label to the deposit;
   using a first scanner, scanning the bar-code at a first location;
   using a second scanner scanning the bar-code at a second location;
   using a third scanner, scanning the bar-code at a third location
   using an electronic receiver including hardware, receiving information corresponding to:
      the first location at a first time;
      the second location at a second time; and the third location at a third time; and identifying a projected time based on the information when at least a portion of a value associated with the deposit will be credited to an account of the client held at a bank.

6. The method of claim 5 further comprising using an electronic transmitter including hardware, transmitting the first time, the second time and the third time to the client.

7. The method of claim 5 further comprising using an electronic transmitter including hardware, transmitting the first time, the second time and the third time to the bank.

8. The method of claim 5 further comprising, using a computer system including hardware, determining:

a first entity responsible for the deposit at the first location;

a second entity responsible for the deposit at the second location; and a third entity responsible for the deposit at the third location.

* * * * *